United States Patent [19]

Clifft et al.

[11] Patent Number: 4,898,672

[45] Date of Patent: Feb. 6, 1990

[54] OXYGEN CONTROLLING WASTEWATER TREATMENT METHOD

[76] Inventors: Ricky C. Clifft, 21 Meriweather Dr., Paragould, Ark. 72450; Melrose T. Garrett, 5237 Chesapeake Way, Houston, Tex. 77056

[21] Appl. No.: 335,580

[22] Filed: Apr. 10, 1989

Related U.S. Application Data

[62] Division of Ser. No. 96,004, Sep. 14, 1987, Pat. No. 4,846,965.

[51] Int. Cl.$^4$ .............................................. C02F 3/26
[52] U.S. Cl. .................................. 210/614; 210/627; 210/741
[58] Field of Search ............... 210/96.1, 110, 120, 210/137, 195.3, 199, 218, 258, 614, 626–628, 739, 741

[56] References Cited

U.S. PATENT DOCUMENTS

| | | | |
|---|---|---|---|
| 3,342,727 | 9/1967 | Bringle | 210/614 |
| 3,547,812 | 12/1970 | McWhirter | 210/627 |
| 3,547,815 | 12/1970 | McWhirter | 210/627 |
| 3,725,258 | 4/1973 | Spector, et al. | 210/627 |
| 3,983,031 | 9/1976 | Kirk | 210/614 |
| 4,062,770 | 12/1977 | Kneer | 210/258 X |
| 4,206,047 | 6/1980 | Mandt | 210/627 |
| 4,271,026 | 6/1981 | Chen, et al. | 210/614 X |
| 4,341,633 | 7/1982 | Walder | 210/614 |
| 4,376,702 | 3/1983 | Small | 210/201 |
| 4,442,005 | 4/1984 | Breider | 210/614 |
| 4,563,281 | 1/1986 | Friedman et al. | 210/614 |
| 4,724,073 | 2/1988 | Caltharp et al. | 210/258 |
| 4,818,408 | 4/1989 | Hamamoto | 210/614 |

OTHER PUBLICATIONS

Clifft et al., "Gas–Liquid Interactions in Oxygen Activated Sludge", Jour. of Environ. Eng., vol. 112, No. 1, Feb., 1986.

*Primary Examiner*—Tom Wyse
*Attorney, Agent, or Firm*—Walker & McKenzie

[57] ABSTRACT

A method of treating wastewater using an aeration tank of the type having an interior divided into at least a first chamber and a last chamber with each of the chambers having a lower portion and an upper portion and having liquid passageways in the lower portions of each of the chambers and gas passageways in the upper portions of each of the chambers for allowing liquid and gas to pass sequentially through each of the chambers from the first chamber to the last chamber, having an effluent outlet associated with the last chamber of the aeration tank for allowing treated water to exit the aeration tank; and having agitator means to enhance oxygen transfer from the upper portion to the lower portion of the aeration tank. The method includes maintaining the pressure in the upper portion of the first chamber of the aeration tank to at or slightly below existing atmospheric pressure; and maintaining the dissolved oxygen in the effluent from the last chamber by removing gas by vacuum from the last chamber of the aeration tank.

4 Claims, 2 Drawing Sheets

OXYGEN CONTROLLING WASTEWATER TREATMENT METHOD

CROSS-REFERENCE TO RELATED APPLICATION

This is a division of application, Ser. No. 07/096,004, filed Sept. 14, 1987, now U.S. Pat. No. 4,846,965.

BACKGROUND OF THE INVENTION

1. Field of the Invention

The present invention relates in general to wastewater treatment methods, and more specifically to a method for controlling oxygen utilization when treating wastewater using a series of closed-tanks and an oxygen-enriched gas (high-purity oxygen). Wastewaters treated with closed-tanks and high-purity oxygen can, for example, be municipal sewage, slaughter house waste, waste from petrochemical and paper plants, or biological sludges generated from wastewater treatment. These wastewaters must be treated to reduce levels of organic matter, nitrogenous compounds phosphorous, and other materials considered as pollutants.

2. Description of the Related Art

A number of different methods have been employed for wastewater treatment. Many of these methods involve biochemical oxidation by aerobic bacteria to convert various pollutants to other forms of matter. A common example is the activated sludge process which utilizes an aeration tank or reactor and a settling tank or clarifier. Wastewater is mixed with a concentrated solution of aerobic bacteria (sludge) in the aeration tank where biochemical oxidation takes place. The mixture (effluent from the aeration tank) is then delivered to the settling tank where the bacteria settle and serve as the concentrated solution (sludge) for return to the aeration tank. Treated water from the settling tank exits generally at the top of the tank and is released for discharge or subsequent treatment.

In order for the biochemical oxidation reaction to take place, oxygen must be supplied to the mixture (mixed liquor) in the aeration tank. The type and rate of reactions are dependent upon the amount of oxygen available for use by the bacteria. Oxygen is usually made available to the bacteria in the form of dissolved oxygen (DO) by dissolution of oxygen into the liquor from the aerating gas above the aeration tank. Air, which has an oxygen partial pressure of about 160 millimeters of Mercury (mm Hg), is the most common source of gas for dissolution of oxygen into the liquor when using open-top aeration tanks. High-purity oxygen can also be used economically as the aerating gas, but the aeration tank must usually enclose the aerating gas space above the liquor in order to achieve a high oxygen utilization efficiency. Since the partial pressure of oxygen in the enclosed gas space is normally above 300 mm Hg, the natural driving force for transferring oxygen from the gas space to the mixed liquor is much higher than for open air systems. When high-purity oxygen is used in this manner with a closed-tank aeration system, the process is usually termed the oxygen activated sludge process.

Several modifications of the oxygen activated sludge process have been proposed that utilize closed-tank aeration systems. These versions include those disclosed in U.S. Pat. No. 3,547,812; U.S. Pat. No. 3,547,815; U.S. Pat. No. 3,725,258; and U.S. Pat. No. 4,442,005. All of these systems require that the pressure in the enclosed gas space be maintained above existing atmospheric pressure for the purpose of forcing oxygen to flow through the system and for positively venting exit gasses to the atmosphere. Venting is necessary to prevent the buildup of nitrogen, carbon dioxide, and other gasses which reduce the partial pressure of oxygen in the gas space and thus reduce the oxygen transfer efficiency of the system. For reasons that will become later apparent and for convenience, only the operation of the conventional oxygen activated sludge process as generally disclosed by U.S. Pat. No. 3,547,815 will be described.

In the conventional oxygen activated sludge process, the aeration tank or reactor is usually separated into two or more closed-tank chambers which operate in series. Wastewater and sludge returned from the settling tank are usually input to the first chamber and the mixed liquor flows through subsequent chambers in the series and eventually to the settling tank or clarifier. High-purity oxygen gas containing from 60 to 99% oxygen by volume is normally input to the gas space of the first chamber, and it flows through the gas space of subsequent chambers concurrent with the mixed liquor. Some versions of the process allow wastewater, return sludge, and high-purity oxygen to be input to any or all chambers of the reactor. Various types of mixing devices are used to enhance oxygen transfer to the mixed liquor of each chamber where dissolved oxygen is consumed by the biological reactions. The most common devices are surface aerators that use a multi-bladed impeller located at the gas-liquid interface and gas recirculation systems that utilize a sparger submerged in the mixed liquor. The mixing devices create a large gas-liquor interfacial area to enhance dissolution of oxygen, and also stir the mixed liquor so that the bacterial solids remain in suspension uniformly throughout each chamber.

High-purity oxygen is usually supplied to the oxygen activated sludge process from an on-site oxygen generating plant or it may be supplied directly from a commercial pipeline. The source of high-purity oxygen is delivered above atmospheric pressure to the system in a controlled manner to provide a near constant gas phase pressure in the first chamber of the reactor. The system is operated at a desired constant pressure of usually 2 to 6 mm Hg above atmospheric pressure in the first chamber. An operating pressure above existing atmospheric conditions is required in the reactor since the exit gases from the last chamber are vented to the atmosphere, and a differential gas phase pressure from the first to the last chamber is needed to force the high-purity oxygen through the series of chambers. The exit gas flow is usually adjusted manually or automatically by means of a valve on the exit gas line in an attempt to provide approximately 50% oxygen in the exit gas (vent gas).

The key to the success of the conventional oxygen activated sludge process is the relatively high oxygen utilization efficiency provided by the oxygen dissolution system. Past attempts to use high-purity oxygen failed to be competitive with air processes because much of the oxygen supplied was usually lost and not used by the biological reactions. Since wastewater flow rates and pollutant concentrations very significantly with time, the oxygen demand by the biological reactions is also highly variable. Thus, to obtain high utilization of oxygen, the oxygen feed rate must be varied to match the demand. This is accomplished more effectively in the conventional oxygen activated sludge system than in prior art systems by controlling the oxygen feed rate based on the total pressure in the first chamber of the reactor. A pressure sensor in the gas phase of the first chamber monitors pressure changes and sends a signal to an oxygen feed controller. Depending on the difference between the measured pressure and the controller setpoint pressure, which is the constant pressure desired in the first chamber, the controller manipulates a control valve on the oxygen feed line as a means of controlling the supply of oxygen and maintaining the desired constant pressure (setpoint pressure). This oxygen feed control strategy is effective since as oxygen demand increases in a closed-tank system, oxygen transfer from the gas to the liquid phase increases causing a decrease in the partial pressure of oxygen in the gas phase and a drop in the total gas phase pressure. Thus, as oxygen demand increases, more oxygen is supplied and as demand decreases, the oxygen supply is reduced.

Although the strategy for controlling oxygen dissolution in the conventional oxygen activated sludge process has allowed the use of high-purity oxygen to be economically competitive with open air systems, the overall oxygen utilization efficiency is usually less than 85% and the potential for further improvement still exists. Since the gas phase pressure is maintained above atmospheric pressure, gas leaks through cracks and pin holes in the cover of a closed-tank reactor can be significant. Oxygen losses due to leakage can exceed 10% of the oxygen feed when operating the first chamber with a 3.7 mm Hg setpoint pressure for controlling the oxygen feed rate. Even for a gas-tight reactor cover, which is practically impossible and very costly to construct, the conventional control strategy usually provides for only 80 to 85% utilization of the oxygen feed by the biological reactions. The remainder of the oxygen feed is lost through dissolved oxygen in the effluent from the reactor and by the intentional venting of exit gasses which include oxygen.

Oxygen losses associated with the conventional control strategy increase as the percentage of oxygen in the gas phase increases causing reduced oxygen utilization efficiency. Therefore, it is best to operate with a percentage of oxygen in the gas phase, and particularly the gas phase of the last chamber, as low as possible without causing dissolved oxygen (DO) levels in the mixed liquor that adversely affect the treatment efficiency. At low biochemical oxygen demand (BOD) loadings, it is possible to operate the system without adverse DO affects by manually adjusting the vent gas control valve to a fixed position to provide an average vent gas composition of less than 50% oxygen. But when BOD loadings approach design capacity of the treatment system, fixing the position of the vent gas valve opening to provide a daily average of 45% oxygen in the vent gas can result in frequent DO depletions because of extreme fluctuations in the percentage of oxygen in the gas phase of the last chamber of the reactor. Attempts have been made to maintain a constant vent gas composition by automatically adjusting the opening of the vent gas valve using a control signal based on measurement of the percentage of oxygen in the vent gas. However, computer simulations using a dynamic model and practical experience indicate that there is no significant advantage of automatic control over periodic manual adjustments of the vent gas valve. Variations in the effluent DO from the reactor and vent gas composition are practically the same as for the case of manually fixing the position of the vent gas valve. Also, DO depletions cannot be prevented at design BOD loadings when using 45% oxygen in the vent as a setpoint for automatic control of the vent gas valve opening.

The inadequacy of vent gas control for the conventional operating scheme is due primarily to the small vent gas flow rates which are limited by operating the reactor with a low pressure in the gas phase. The vent gas flow rate is very small relative to the gas phase volume, thus making it difficult to rapidly change the vent gas composition. If higher setpoint pressures are used for controlling the oxygen feed, better control of the vent gas composition is achieved, but oxygen losses also increase because gas phase leaks are dependent on the gas phase pressure. Thus, it is obvious that the oxygen feed and vent gas control objectives are conflicting from the standpoint of minimizing oxygen losses and very few adjustments can be made to further improve the oxygen utilization efficiency for the conventional operating method. The primary deficiencies are the need to operate the gas phase above atmospheric pressure and the inability to control the oxygen level in the vent gas and the effluent DO from the reactor.

A preliminary patentability search in class 210, subclasses 614, 623 and 627 disclosed the following patents: Bringle, U.S. Pat. No. 3,342,727; McWhirter, U.S. Pat. No. 3,547,812; McWhirter, U.S. Pat. No. 3,547,815; Spector et al, U.S. Pat. No. 3,725,258; Kirk, U.S. Pat. No. 3,983,031; Mandt, U.S. Pat. No. 4,206,047; Chen et al, U.S. Pat. No. 4,271,026; Breider, U.S. Pat. No. 4,442,005; and Friedman et al, U.S. Pat. No. 4,563,281. None of the above prior art disclose or suggest the present invention which is based upon the finding that significant improvements in oxygen utilization efficiency can be achieved when using high-purity oxygen by operating a closed-tank reactor at or below atmospheric pressure and using an exhaust apparatus to remove vent gasses from the last chamber of the reactor.

OBJECTIVES OF THE INVENTION

It is a principle objective of the present invention to provide methods for aerobic wastewater treatment using high-purity oxygen whereby the oxygen utilization efficiency is maximized, and in general, the process becomes more economical than earlier attempts to use high-purity oxygen.

It is a further objective of the present invention to provide methods for controlling the oxygen feed rate to a closed-tank reactor consisting of a series of chambers so as to maintain the pressure in the enclosed gas space at or below atmospheric conditions and thereby minimize oxygen losses through gas leaks in the reactor cover.

Another objective of the present invention is to provide methods for controlling the vent gas flow rate from a closed-tank reactor with a series of chambers using high-purity oxygen by exhausting gas by vacuum from the last chamber to maintain a desired dissolved oxygen (DO) concentration in the effluent from the reactor and thereby minimize oxygen losses through the vent as and effluent DO.

Still another objective of the present invention is to provide methods for controlling oxygen utilization that can be easily retrofitted to existing treatment systems using the conventional oxygen activated sludge process.

Other objectives and advantages will become apparent from the following description of the present invention and the appended claims.

SUMMARY OF THE INVENTION

The present invention is directed toward providing an improved wastewater treatment method. The method of treating wastewater of the present invention uses an aeration tank of the type having an interior divided into at least a first chamber and a last chamber with each of said chambers having a lower portion and an upper portion and having liquid passageways in said lower portions of each of said chambers and gas passageways in said upper portions of each of said chambers for allowing liquid and gas to pass sequentially through each of said chambers from said first chamber to said last chamber, having an effluent outlet associated with said last chamber of said aeration tank for allowing treated water to exist said aeration tank; and having agitator means to enhance oxygen transfer from said upper portion to said lower portion of said aeration tank. The method includes maintaining the pressure in said upper portion of said first chamber of said aeration tank to at or slightly below existing atmospheric pressure; and maintaining the dissolved oxygen in the effluent from said last chamber by removing gas by vacuum from said last chamber of said aeration tank.

The present invention involves a method for controlling oxygen dissolution that minimizes oxygen losses in the oxygen activated sludge process. This strategy controls the oxygen feed in a conventional manner, but the setpoint pressure in the first chamber is reduced to existing atmospheric pressure or below. Since the pressure drop through the aeration tank gas phase is usually near one mm Hg, the subsequent chambers operate with slight negative pressure which will eliminate oxygen losses through gas phase leaks. In order to prevent DO depletions and minimize oxygen losses through the vent gas, an exhaust apparatus is used to manipulate the vent gas flow rate from the last chamber of the reactor. The exhaust apparatus can be an air jet ejector, a positive displacement blower, or any other type of apparatus capable of operating with a slight negative pressure at the suction inlet and operating in a high-purity oxygen atmosphere. One or more dissolved oxygen probes, located either in the last chamber liquid phase or in the stilling well of the clarifier following the reactor, are used to provide a control signal for an exit gas controller. Methods for on-line estimation of the effluent dissolved oxygen might also be used to provide the control signal. The controller regulates the vent gas apparatus and varies the vent gas flow in an attempt to maintain the desired (setpoint) dissolved oxygen level. This method of controlling the vent gas is superior to the conventional control method since the vent gas flow is not limited by the pressure in the gas phase and it can be retrofitted to existing plants. It should be recognized that various types of mixing devices or number of chambers may be used as in the many modifications of the oxygen activated sludge process.

The method for controlling oxygen dissolution of the present invention has several advantages when compared to the conventional control method. Because the system is operated at or below atmospheric conditions, oxygen losses through cracks in the aeration tank cover will be eliminated. Oxygen losses due to leaks typically range from 5 to 15% of the oxygen feed in conventional systems. Routine repair of gas phase leaks can be a significant maintenance cost for systems using the conventional control method, but leak repairs should not be necessary, or at least not as frequent, with the present invention.

Construction costs for new plants using the present invention should be less since design and construction practices to limit pin holes and cracks in the reactor cover should not be as critical. Also, the present invention will allow smaller gas-liquid volume ratios for the reactor chambers than are currently used. Typically, the gas phase volume is from one-third to one-half of the liquid phase volume in each chamber of the conventional oxygen activated sludge process. With the present invention the gas phase volume can be from one-fifth to one-tenth of the liquid phase volume since better control over DO is achieved. To obtain a given treatment efficiencies, i.e., a given percentage of BOD removal for example, the liquid phase volume of the present invention must be similar to the volume required by the conventional oxygen activated sludge process. However, since the gas phase volume can be significantly reduced, significant savings in construction costs will result for the present invention because of a smaller gas phase volume and thus a smaller overall size for the reactor.

The method of the present invention will significantly reduce oxygen losses in the effluent dissolved oxygen (DO) that are common for the conventional control method. Oxygen losses in the effluent liquid phase range from 5 to 15% of the oxygen feed for conventional control. These large losses are due to the necessity of operating with near 50% oxygen in the vent gas since the conventional control strategy cannot effectively control the vent gas oxygen content to maintain a low level of oxygen in the effluent liquid phase. With the system and method of the present invention, oxygen losses in the effluent can be reduced to approximately 2% without causing DO depletions because of its ability to control vent gas composition and effluent DO.

It is expected that use of the method of the present invention will enable new plants to be constructed with oxygen production facilities that are sized to produce 10 to 20% less oxygen. Although this will reduce the initial cost of plants, the reduction in operating costs to produce oxygen will be more significant. Now that cryogenic oxygen plants can be built with turn-down capability and equipped with energy optimization systems, energy savings can be significant particularly for large treatment plants. As compared to the conventional control method, overall reductions in oxygen usage should range from 15 to 25% while energy savings will range from 5 to 15%.

A summary of other benefits of the method of the present invention include:

1. Oxygen utilization efficiencies in the range of 90 to 98% can be achieved depending on the amount of atmospheric air that leaks into the reactor from the outside and the DO setpoint for the vent gas controller. Higher oxygen utilization will result in 15 to 25% (typically) less oxygen being required as compared to operating with conventional control methods.

2. Improved control of the gas phase composition will result from the use of the present invention. Oxygen levels in the last chamber as low as 20 to 30% can be used without concern for DO depletion provided that mixing devices are properly sized. This allows very efficient operation during startup years and periods of low organic loading since most mixing devices are sized for the future design capacity of the treatment system and do not require high oxygen levels above 30% to transfer the needed oxygen for low BOD loadings. This may also allow reduced horsepower requirements or better use of multiple speed aeration equipment for mixing.

3. The present invention will improve the overall marketability of the oxygen activated sludge process. The ability to minimize oxygen usage should help to justify the use of energy optimization systems and built-in turn-down capability for oxygen production plants.

4. The present invention is relatively easy to operate and inexpensive to use. The strategy requires very little additional equipment and controls as compared to the conventional control method and can be easily retrofitted to existing plants. Very little operator attention is needed and no additional expertise is required.

5. The present invention is applicable to any process for the purpose of transferring a gas to a liquid when using closed-tank rectors. This includes aerobic oxidation of sludge for sludge digestion.

DESCRIPTION OF THE PREFERRED EMBODIMENTS

Practical use of the present invention preferably involves the use of an aeration tank with at least two closed chambers operated in series. High-purity oxygen is fed to the first chamber in a controlled manner to maintain a constant pressure at or below atmospheric pressure in the first chamber as phase. Vent gasses are removed by vacuum from the second or last chamber using an exhaust apparatus which is controlled to maintain a constant dissolved oxygen level in the effluent from the last chamber. Any number of chambers can be added between the first chamber and the last chamber. It is generally known that improvements in wastewater treatment and oxygen utilization efficiency increase with the number of chambers operated in series, but little advantage is obtained by using more than four chambers. Therefore, for purposes of convenience, and only for such purposes, the present invention will now be described for the case of an aeration tank with four chambers operated in series.

Figure 1:
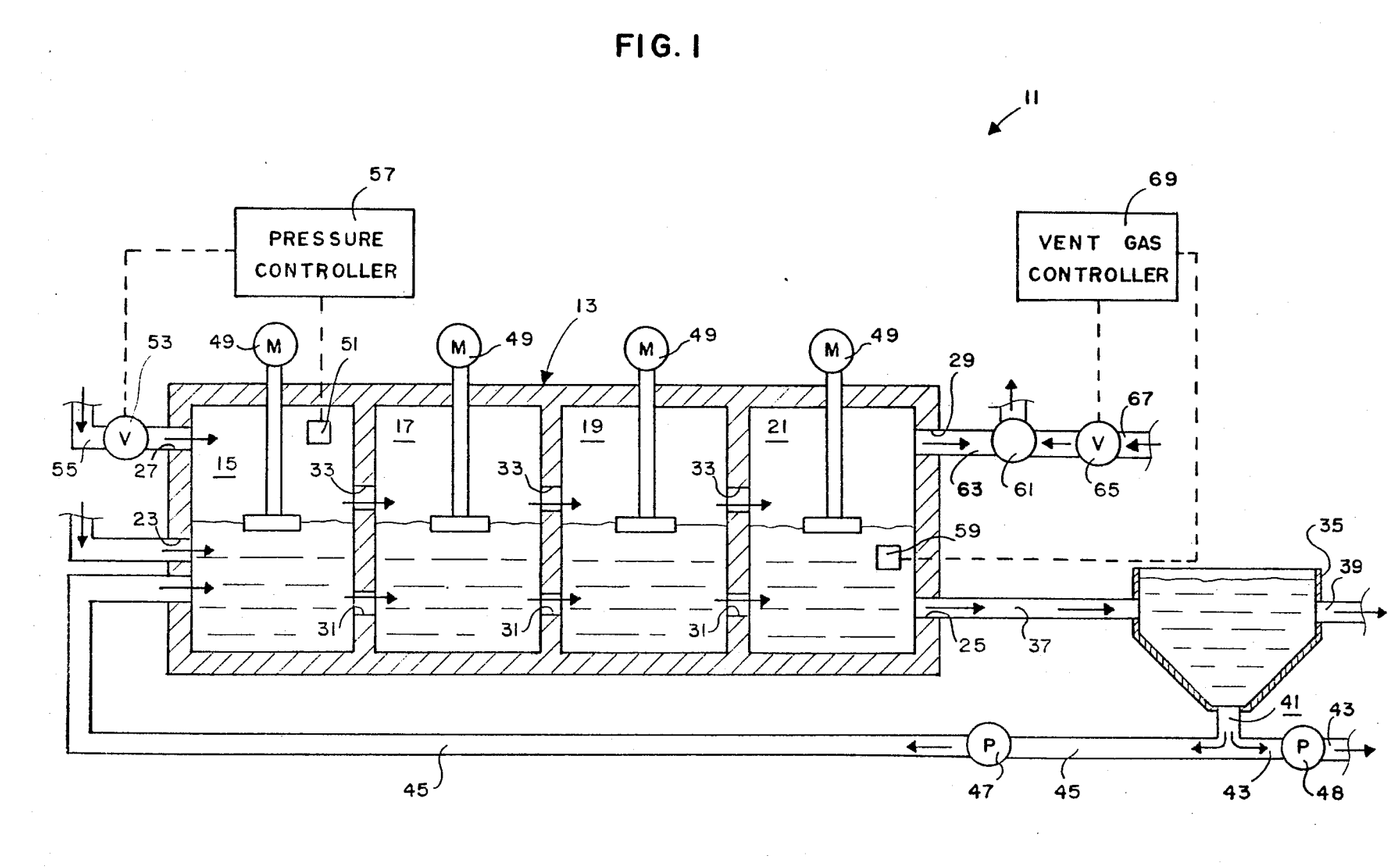
FIG. 1 is a schematic of a sectional side view showing the wastewater treatment system using the method of the present invention.

Referring now to FIG. 1, the preferred embodiments of the wastewater treatment method of the present invention uses a wastewater treatment system 11 that includes an aeration tank 13. The interior of the aeration tank 13 is divided into at least a first reactor or chamber and a last reactor or chamber. More specifically, the interior of the aeration tank 13 may be divided into a first chamber 15, a second chamber 17, a third chamber 19, and a fourth chamber 21 as shown in FIG. 1. An influent passageway or inlet 23 is provided for allowing fluid (i.e., wastewater to be treated) to be introduced into the interior of the aeration tank 13. An effluent passageway or outlet 25 is provided for allowing fluid (i.e., mixed liquor) to exit the interior of the aeration tank 13. The influent inlet 23 is preferably associated with the first chamber 15 and the effluent outlet 25 is preferably associated with the fourth chamber 21. A gas inlet 27 is provided for allowing high-purity oxygen to be introduced into the interior of the aeration tank 13. A gas outlet 29 is provided for allowing vent gasses (i.e., primarily nitrogen, carbon dioxide, and oxygen) to exit the interior of the aeration tank 13. Each chamber 15, 17, 19, 21 can be divided generally into a lower portion for receiving the fluid and an upper portion for receiving the gas. Fluid passageway means 31 are associated with the lower portions of each chamber 15, 17, 19, 21 for allowing the fluid to pass sequentially through the aeration tank 13 from the first chamber to the last chamber. Gas passageway means 33 are associated with the upper portions of each chamber 15, 17, 19, 21 for allowing the gas to pass sequentially through the aeration tank 13 from the first chamber to the last chamber. The fluid and gas passageway means 31, 33 may consist simply of apertures through the walls of the tank 13 between the chambers 15, 17, 19, 21 as clearly shown in FIG. 1. The specific size of the lower portion of each chamber 15, 17, 19, 21 may vary depending on the volume and characteristics of the wastewater to be treated as will now be apparent to those skilled in the art. The size of the upper portion (gas space) of each chamber 15, 17, 19, 21 is preferably not less than one-third of the size of the lower portion. The aeration tank 13 is preferably constructed out of concrete, but the construction materials can be any type suitable for wastewater treatment systems as will now be apparent to those skilled in the art.

The system 11 preferably includes a typical settling tank or clarifier 35 coupled to the effluent outlet 25 by way of a conduit 37 or the like for allowing the mixed liquor to settle for reasons and in the typical manner well known to those skilled in the art. An outlet conduit or line 39 extends from the clarifier 35 for allowing treated liquid to exit the system 11. A sludge conduit or line 41 extends from the clarifier 35 to allow sludge to exit the clarifier 35. The sludge line 41 is preferably divided into a first portion 43 to allow at least a portion of the sludge to exit the system 11 and a second portion 45 for allowing a portion of the sludge to be introduced into the first chamber 15 of the aeration tank 13. A pump 47 may be associated with the second portion 45 of the sludge line 41 to pump sludge into the first chamber 15 of the aeration tank 13. A pump 48 may also be associated with the first portion 43 of the sludge line 41 to waste sludge from the system 11. The specific construction and operation of the clarifier 35 will now be apparent to those skilled in the art and may vary as will now be apparent to those skilled in the art.

The system 11 includes agitator means 49 associated with each chamber 15, 17, 19, 21 for mixing the fluid and enhancing oxygen transfer in each chamber 15, 17, 19, 21 in a manner and for reasons which will now be apparent to those skilled in the art. Each agitator means 49 may consist of an agitator blade located substantially at the surface of the fluid in the respective chamber and a drive motor coupled to the agitator blade by a drive shaft or the like as will now be apparent to those skilled in the art. The agitator means 49 is preferably operated by a single speed motor, but a multi-speed motor may be used to reduce power consumption at times of low oxygen demand as will now be apparent to those skilled in the art.

The system 11 includes pressure control means for maintaining the pressure within the first chamber of the aeration tank 13 at or below existing atmospheric pressure. The pressure control means preferably includes a pressure sensor 51 for sensing the differential pressure (gas pressure relative to atmospheric pressure) of the upper portion of the first chamber 15 of the aeration tank 13, a valve means 53 located in a conduit 55 extending between the source of high-purity oxygen (not shown) and the gas inlet 27 for controlling the flow of high-purity oxygen into the interior of the aeration tank 13, and a pressure controller 57 coupled to the pressure sensor 51 and the valve 53 to control the valve 53 depending on the differential pressure level measured by the pressure sensor 51. The pressure sensor 51 is preferably model T30, manufactured by Modus Instruments of Northboro, MA. The valve 53 is preferably a globe body control valve equipped with a model P-25 actuator which uses air to open and a model E69F signal convertor, all of which are manufactured by The Foxboro Company of Foxboro, MA. The assembly and individual operation of valve 53, pressure controller 57, and associated components will now be apparent to those skilled in the art.

To ensure a full understanding of the combined operation of pressure sensor 51, valve 53, and pressure controller 57, the following illustration is provided. The setpoint pressure, i.e., the desired differential pressure in the upper portion of chamber 15 relative to existing atmospheric pressure, for pressure controller 57 is preferably 0.0 mm Hg or less. The oxygen demand of the biological reactions in the lower portion of chamber 15 will usually change with time depending on the changing characteristics of the influent wastewater entering through inlet 23. Thus, for example, as the oxygen demand increases in the low portion of chamber 15, more oxygen will be transferred to the lower portion from the upper portion of chamber 15 by agitator means 49. This will result in a decrease in the partial pressure of oxygen in the upper portion of chamber 15 and a drop in the total pressure and will cause pressure sensor 51 to measure a larger differential pressure relative to existing atmospheric pressure. As a result, the difference between the differential pressure measured by sensor 51 and the setpoint pressure of pressure controller 57 will become larger causing the pressure controller 57 to drive valve 53 in a more open position thereby increasing the flow of high-purity oxygen to the upper portion of chamber 15 through conduit 55 and gas inlet 27. Consequently, the pressure in the upper portion of chamber 15 will increase if the oxygen feed rate exceeds the oxygen transfer rate from the upper to the lower portion of chamber 15 thereby decreasing the differential pressure measured by pressure sensor 51. Based on the brief description given above, it will be apparent to those skilled in the art that the total pressure in the upper portion of chamber 15 will be maintained near constant, and the differential pressure measured by pressure sensor 51 will be maintained near the setpoint pressure of the pressure controller 57.

The system 11 includes vent gas control means for controlling the amount of gas that is removed from the interior of the tank. The vent gas control means preferably includes a dissolved oxygen sensor 59 for sensing the level of dissolved oxygen in the fluid leaving the last chamber 21 through outlet 25 and conduit 37. The dissolved oxygen sensor 59 may thus be located in the lower portion of the fourth chamber 21 for reasons obvious to those skilled in the art. The vent gas control means also preferably includes a n air jet vacuum ejector 61 associated with the gas outlet 29 of the aeration tank 13 and conduit 63 for removing gas by vacuum from the interior of chamber 21, a control valve 65 located in conduit 67 extending between the motive air source (not shown) and the air jet vacuum ejector 61 for controlling the flow of motive air into the air jet vacuum ejector 61, and a vent gas controller 69 coupled to the dissolved oxygen sensor 59 and the control valve 65 to control the motive air flow to the air jet vacuum ejector 61 depending on the amount of dissolved oxygen sensed by the dissolved oxygen sensor 59. The dissolved oxygen sensor 59 is preferably model 5141DO, manufactured by Great Lakes Instruments, Inc. of Milwaukee, WI. The air jet vacuum ejector 61 is preferably of the type manufactured by Fox Valve Development Corporation of East Hanover, NJ. The control valve 65 is preferably a globe body control valve equipped with a model P-25 actuator which uses air to open and a model E69F signal converter, all of which are manufactured by The Foxboro Company of Foxboro, MA. The vent gas controller 69 is preferably a microprocessor with a dissolved oxygen analyzer such as model 90D1F1A1N, manufactured by Great Lakes Instruments, Inc. of Milwaukee, WI. The assembly and individual operation of the dissolved oxygen sensor 59, air jet vacuum ejector 61, control valve 65, vent gas controller 69 and associated components will now be apparent to those skilled in the art.

To ensure a full understanding of the combined operation of the dissolved oxygen sensor 59, air jet vacuum ejector 61, control valve 65, and vent gas controller 69, the following operation example of the vent gas control apparatus is provided. Motive air to operate the air jet vacuum ejector 61 is preferably supplied from a source of compressed air with a near constant pressure of more than 60 pounds per square inch (psi) above atmospheric pressure. In order to assure a high efficiency for aerobic wastewater treatment, the dissolved oxygen (DO) concentration in the lower portions of aeration tank 13 is preferably maintained above 0.5 milligrams per liter (mg/l). Common practice is to maintain the DO concentration above 2 mg/l at all times, and thus, for purposes of demonstrating vent gas control of the present invention, the operation will be described for the case of controlling the vent gas flow in an attempt to maintain a DO concentration of 2 mg/l in the lower portion of chamber 21 of aeration tank 13. In this case the DO setpoint for the vent gas controller 69 would be set at 2 mg/l, and the actual DO concentration measured by DO sensor 59 in chamber 21 would oscillate about the 2 mg/l setpoint. Under conditions of constant biological oxygen demand and a DO concentration of 2 mg/l in chamber 21, i.e., steady-state conditions, adjustments in the opening of control valve 65 would not be made by the vent gas controller 69. But for example, when biological oxygen demand increases, the DO concentration in the lower portion of chamber 21 will drop. As the DO concentration drops below 2 mg/l, the difference between the DO concentration measured by DO sensor 59 and the SO setpoint will increase, and vent gas controller 69 will drive the control valve 65 to a more open position. This action will cause the motive air flow rate to the air jet vacuum ejector 61 to increase thereby increasing the rate of exhausting gas by vacuum from the upper portion of chamber 21 through conduit 63. As a result, inert gases such as nitrogen will be removed from the upper portion of chamber 21 more rapidly than they enter from chamber 19 and by transfer from the lower portion of chamber 21, causing an increase in the partial pressure of oxygen in the upper portion of chamber 21. At a constant mixing rate by agitator means 49, the higher partial pressure of oxygen will result in a higher oxygen transfer rate to the lower portion of chamber 21. Eventually, as the oxygen transfer rate exceeds the biological oxygen demand, the DO concentration in the lower portion of chamber 21 will begin to increase toward 2 mg/l. As the DO concentration increases, the difference between the DO concentration measured by DO sensor 59 and the DO setpoint decreases, and vent gas controller 69 adjusts the control valve 65 to a more closed position. Gradually closing of the control valve 65 will continue as long as the DO concentration measured by DO sensor 59 increases toward 2 mg/l. When the DO sensor 59 measures a DO concentration of 2 mg/l, the control valve 65 will be fully closed and will remain closed as long as the DO sensor 59 measures a DO concentration increasing above 2 mg/l. At some later point in time when oxygen demand increases again, the partial pressure of oxygen in the upper portion of chamber 21 will decrease thereby causing lower oxygen transfer rates and a drop in the DO concentration in the lower portion of chamber 21, and the control actions described will be repeated. These actions will result in a near constant DO concentration in the fluid leaving the lower portion of chamber 21 as will now be apparent to those skilled in the art.

Operation of the exemplary embodiment as shown in FIG. 1 is intended to be continuous and capable of excepting an influent wastewater of constant or varying characteristics. In essence, the system 11 is conditioned for operation in a normal or steady-state mode, operation under heavy BOD loadings, and operation under relatively light BOD loadings. Gas passageways 33 between the upper portions of each chamber 15, 17, 19, 21 are sized to provide a slight pressure drop as gas flows sequentially through the series of chambers under all operating conditions thereby minimizing any backmixing or reverse flow through the passageways 33. The pressure drop from the upper portion of chamber 15 to the upper portion of chamber 21 is preferably near 0.5 mm Hg when operating under relatively light BOD loadings. As the BOD loading increases, the oxygen demand in the lower portions of the aeration tank 13 increases and more oxygen is introduced to the upper portion of chamber 15 by means of pressure controller 57 to maintain the desired setpoint pressure. Also, under these conditions of higher BOD loadings, high gas flow rates will usually be exhausted from the upper portion of chamber 21 by means of vent gas controller 69 to maintain the desired DO concentration in the lower portion of chamber 21. As a result of higher inlet oxygen and vent gas flow rates, the pressure drop from the upper portion of chamber 15 to the upper portion of chamber 21 will increase. This pressure drop through the upper portions of aeration tank 13 is preferably not more than 4 to 6 mm Hg when operating under heavy BOD loadings. If the setpoint pressure for pressure controller 57 is adjusted to 0.0 mm Hg, the pressure in the upper portion of chamber 15 of aeration tank 13 will be near existing atmospheric pressure and the pressure in the upper portion of chambers 17, 19, 21 will be below existing atmospheric pressure for all conditions of BOD loadings. Thus, oxygen losses through leaks in any cracks or unintended openings in the upper portion of chambers 17, 19, 21 will not occur, but atmospheric air will enter chambers 17, 19, 21 if unintended openings exist.

Figure 2:
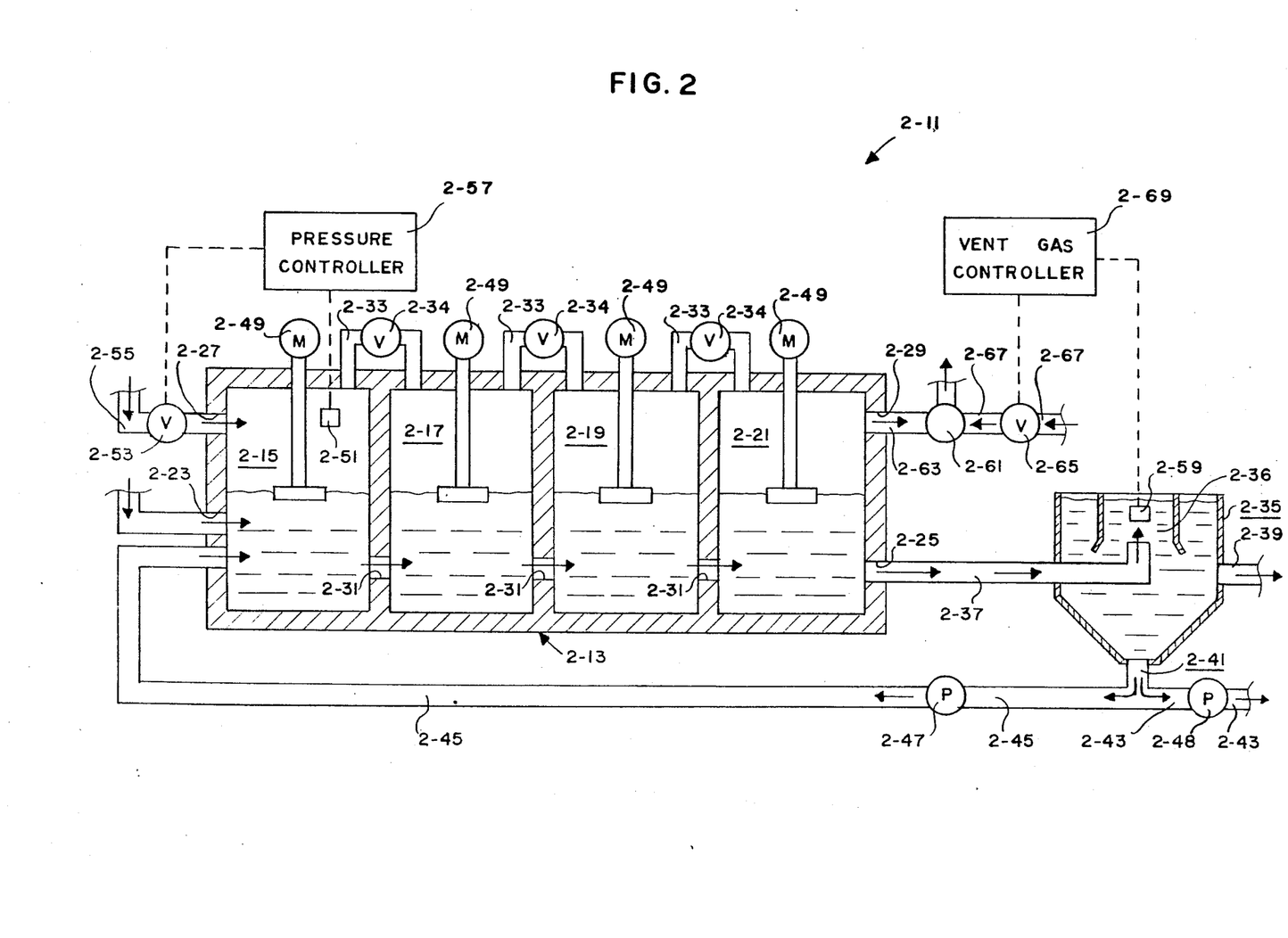
FIG. 2 is a schematic of a sectional side view showing an alternative embodiment for a wastewater treatment system using the method of the present invention.

Referring now to FIG. 2, illustrated therein is an alternative embodiment of the present invention employing controlled gas passageways and an alternative placement of the DO sensor. As a considerable portion of the structure illustrated in FIG. 2 is common to that previously described in connection with the preferred embodiment illustrated in FIG. 1, like components are identified by the same numeral having a prefix "2-" and primary attention will now be directed to the additional structure and differences depicted in FIG. 2. The specific size of the lower portion of each chamber 2-15, 2-17, 2-19, 2-21 may vary depending on the volume and characteristics of the wastewater to be treated as with the embodiment illustrated in FIG. 1. However, the size of the upper portion (gas space) of each chamber 2-15, 2-17, 2-19- 2-21 is preferably less than one-third of the size of the lower portion. The gas passageway means 2-33 shown in FIG. 2 that allows gas to pass sequentially through the upper portions of chambers 2-15, 2-17, 2-19, 2-21 preferably includes external conduits extending between adjacent ones of the chambers 2-15, 2-17, 2-19, 2-21 as clearly shown in FIG. 2. A manual control valve 2-34 is preferably provided in each of the conduits for allowing adjustment of the gas flow rates between the upper portion of the chambers and thereby the pressure drop from chamber 2-15 to chamber 2-17, the pressure drop from chamber 2-17 to 2-19, and the pressure drop from chamber 2-19 to 2-21. The remaining difference between FIG. 2 and FIG. 1 is the placement of DO sensor 2-59 in the stilling well 2-36 of the clarifier 2-35 rather than in the lower portion of chamber 2-21 of aeration tank 2-13. The location of DO sensor 2-59 may be more advantageous because of maintenance reasons. Some DO sensor types become frequently fouled and require routine clearing and calibration. When DO sensors are placed in the lower portion of chamber 2-21, they are not easily accessed and the scum layer, buildup of hair, and other matter may cause poor DO sensor performance and more frequent cleaning and calibration. By locating the DO sensor 2-59 in the stilling well 2-36 of clarifier 2-35, most of these problems are minimized. Also, part experience indicates that the DO concentration in the stilling well of clarifier 2-35 is essentially the same as the DO concentration in the lower portion of chamber 2-21 of aeration tank 2-13.

Operation of the exemplary embodiment as illustrated by FIG. 2 will now be briefly explained knowing that the operating is essentially the same as the embodiment shown in FIG. 1 with the exception of the added flexibility of controlling gas passage between chambers of the aeration tank 2-13. Gas passageway means 2-33 between the upper portions of each chamber 2-15, 2-17, 2-19, 2-21 are sized with control valve 2-34 in a fully open position to provide a slight pressure drop as gas flows sequentially through the series of chambers thereby minimizing any backmixing or reverse flow through the passageway means 2-33. The pressure drop from the upper portion of chamber 2-15 to the upper portion of chamber 2-21 is preferably near 2.0 mm Hg when operating under relatively light BOD loadings and control valve 2-34 in a fully open position. As the BOD loading increases, more oxygen is introduced to the upper portion of chamber 2-15 by means of pressure controller 2-57 and more gas is exhausted from the upper portion of chamber 2-21 by means of vent gas controller 2-69. As a result of higher inlet oxygen and vent gas flow rates, the pressure drop from the upper portion of chamber 2-15 to the upper portion of chamber 2-21 will increase even when control valve 2-34 is fully open. However, when using a small gas phase volume (upper portion) relative to the liquid phase volume (lower portion) in the aeration chambers as intended in the alternative embodiment of FIG. 2, the pressure drop through the upper portion of aeration tank 2-13 must be greater than the pressure drop through the upper portion of aeration tank 13 of the embodiment illustrated by FIG. 1. A larger pressure drop is required in the upper portions of aeration tank 2-13 to prevent interaction of the oxygen feed and vent gas control apparatuses. Small pressure drops result in instability of the pressure controller 2-57 and an inability to maintain a near constant pressure in the upper portion of chamber 2-15. A control valve 2-34 is thus preferred in each of the gas passageways 2-33 so that adjustments in the pressure drop between chambers of aeration tank 2-13 can be made. Since most treatment facilities are designed to efficiently treat BOD loadings expected several years in the future, the system 2-11 is preferably designed to operate initially with control valve 2-34 in a fully open position. As average daily BOD loadings increase through the design life of the system 2-11, control valve 2-34 will be adjusted manually to a more closed position to provide the necessary pressure drop through the upper portions of aeration tank 2-13.

A computer model of the preferred embodiment shown by FIG. 1 was simulated to illustrate the oxygen utilization efficiency and other characteristics of the system 11. Calibration of the model was based on an existing oxygen activated sludge plant designed to be operated with conventional controls and with a treatment capacity of 25 million gallons of domestic sewage per day (MGD). This plant consists of an aeration tank with four chambers in series, and the gas phase or upper portion of each chamber is approximately 0.43 times the liquid phase or lower portion of each chamber. The plant uses surfaces mixers in each chamber running at a constant speed at all times. Computer simulations were made for wastewater flows representing 80% and 100% of the treatment capacity for a 24 hour period. The influent flow for the simulations had a 1 to 1.7 ratio for minimum to maximum flow and followed a diurnal pattern consisting of 12.5 hours at maximum flow and 11.5 hours at minimum flow. Model parameters used to account for leaks in the upper portion of each chamber were based on actual field tests conducted at the existing treatment plant. The total cross-sectional area of crack openings in the upper portion of the first three chambers was simulated as being approximately equal for each chamber while the area of crack openings in the last chamber was approximately 6½ times the area of the openings in any one of the first three chambers.

An oxygen balanced for the entire system 11 and other characteristics are summarized in the table below for the simulation runs. Run 1 was for the case of an average influent loading of 80% of treatment capacity; Run 2 was for the case of an average influent loading of 100% of treatment capacity; and Run 3 was for the case of an average influent loading of 100% of treatment capacity with the area of gas leakage in the last chamber adjusted to equal the area for leakage in the first three chambers.

TABLE

SUMMARY OF OPERATIONAL CONDITIONS AND RESULTS FOR FOUR CHAMBER AERATION TANK USING PREFERRED EMBODMENT OF FIG. 1

| RUN | 1 | 2 | 3 |
|---|---|---|---|
| Oxygen Inputs (kilogram oxygen) | | | |
| Oxygen Feed | 11,935 | 16,512 | 15,779 |
| Influent and Recycle | 375 | 463 | 463 |
| Air Leaks | 345 | 522 | 161 |
| Total | 12,655 | 17,497 | 16,403 |
| Oxygen Sinks (kilogram oxygen) | | | |
| Biological Reactions | 11,332 | 14,569 | 14,569 |
| Effluent | 268 | 363 | 336 |
| Vent Gas | 1,055 | 2,565 | 1,498 |
| Chamber Leaks | 0 | 0 | 0 |
| Total | 12,655 | 17,497 | 16,403 |
| Fourth Chamber Characteristics | | | |
| Average Percent Oxygen in Gas Phase | 24.4 | 33.4 | 33.9 |
| Average Percent Carbon Dioxide in Gas Phase | 20.1 | 20.1 | 21.1 |
| DO Range in Liquid (mg/l) | 1.3–4.5 | 0.7–5.5 | 0.6–5.8 |
| Average DO in Liquid (mg/l) | 2.4 | 2.7 | 2.5 |
| Average pH in Liquid | 6.08 | 6.08 | 6.06 |
| Control Setpoints | | | |
| First Chamber Differential Pressure (mm Hg) | 0.0 | 0.0 | 0.0 |
| Fourth Chamber DO (mg/l) | 3.0 | 4.0 | 3.0 |
| Maximum Vent Gas Flow (1000 l/hr*) | 315 | 592 | 436 |
| Pressure Drop From First to Fourth Chamber at Maximum Vent Gas Flow (mm Hg) | 2.2 | 6.5 | 5.9 |
| Oxygen Feed Purity (% oxygen) | 98.2 | 98.2 | 98.2 |
| Recycle Flow, Constant (MGD) | 9.2 | 9.2 | 9.2 |

*l/hr = liters per hour

The oxygen utilization efficiency, i.e., the percentage of the oxygen feed utilized by the biological reactions, was 94.9% for Run 1. Oxygen losses occurred through intentional venting and the effluent DO from the last or fourth chamber. Although the fourth chamber DO had a relatively wide oscillation around the DO setpoint, low DO concentrations occurred for only a short time, and higher DO setpoints could be used if needed. The effluent DO from the fourth chamber was greater than 1.9 mg/l for 88% of the time when using a 3 mg/l DO setpoint. As with the conventional oxygen activated sludge process, gas phase leaks through cracks in the upper portion of the aeration chambers are important for the present invention but for a different reason. The oxygen utilization efficiency for Run 2 was 88.2% compared to 94.9% for Run 1. The lower efficiency at design treatment capacity (Run 2) was caused by large amounts of air leaking into the fourth chamber which diluted the oxygen level in the gas phase. Much higher vent gas flow rates were required for Run 2 to obtain the high partial pressure of oxygen needed to maintain DO in the lower portion of the fourth chamber. This caused lower pressures in the fourth chamber gas phase, high air leakage rates, and resulted in lower oxygen utilization. The fourth chamber air leaks caused DO depletions when using a 3 mg/l DO setpoint, and a 4 mg/l setpoint was required to prevent DO depletions for Run 2. When the area for air leakage in the fourth chamber was reduced to the same value as for the first three chambers as in Run 3, the oxygen utilization efficiency increased to 92.3%. The smaller leakage rate in the fourth chamber for Run 3 is probably more typical of most existing plants since it would result in an overall loss of approximately 8% of the oxygen feed due to leaks when operating with conventional controls. Run 3 also indicates that a DO setpoint of 3 mg/l can be used when leakage in the fourth chamber is reduced, and the maximum vent gas flow rate can be reduced from 592,000 to 436,000 l/hr. This is significant since motive air requirements for the air jet vacuum ejector would be less thereby reducing the cost of the system.

The preferred embodiment of the present invention as illustrated in FIG. 1 is applicable to many existing oxygen activated sludge plants since these plants are constructed with the upper portion of the aeration chambers being usually greater than one-third of the size of the lower portion of the aeration chambers. Also, many existing plants have a fixed-size opening in the wall between chambers to allow for gas passage. When existing plants are modified or retrofitted with the proper apparatus in accordance with the teachings of the present invention, whether they incorporate the DO sensor in the lower portion of the last aeration chamber or in the stilling well of the clarifier, they can be expected to operate as essentially illustrated in the above Table. For new plant construction, however, it is desirable to minimize overall construction costs as well as operating costs. In this case the use of the alternative embodiment of FIG. 2 may be preferred.

Computer simulations of the alternative embodiment illustrated by FIG. 2 were made based on the same model as described above which was used to simulate the embodiment shown by FIG. 1. The only exceptions in these additional simulations were a reduction in the gas phase volume of each aeration chamber and a gas leakage area in the fourth chamber equal to the gas leakage area in each of the first three chambers. These simulations indicate no significant improvement in the oxygen utilization efficiency of system 2-11, but much better control of the DO concentration in chamber 2-21 of aeration tank 2-13 was achieved as a result of the smaller gas phase volume. When using a gas phase volume in each chamber equal to 0.2 times the volume of the liquid phase in each chamber, the DO concentration in the lower portion of the last chamber ranged from 1.4 to 4.1 mg/l over the 24 hour simulation period for an average influent loading of 80% treatment capacity. For this case the maximum vent gas flow was 280,000 l/hr at a pressure drop of 7.5 mm Hg from the first to the fourth chamber. When using a gas phase volume in each chamber equal to 0.1 times the volume of the liquid phase in each chamber, control over the DO concentration in the lower portion of the last chamber was improved further. For the simulation with an average influent loading of 80% of treatment capacity, the DO concentration in the last chamber ranged from 1.5 to 2.9 mg/l. However, the maximum pressure drop through the gas phase was practically twice as much (13.7 mm Hg), but the maximum vent gas flow rate was reduced to 265,000 l/hr. These simulations indicate that the proper sizing of the gas phase volume relative to the liquid phase volume is preferably determined economically so as to minimize the sum of the reactor construction costs and the initial and operating costs of the vent gas control apparatus. The gas-tightness of the reactor will also be an important consideration since air leakage into the reactor will increase as the pressure drop from the first to the fourth chamber increases.

The preferred embodiments of the wastewater treatment method of the present invention include the steps of maintaining the pressure in the upper portion of the first chamber of the aeration tank at or below existing atmospheric pressure; and removing gas by vacuum from the last chamber of the aeration tank. The preferred method of maintaining the pressure in the upper portion of the first chamber of the aeration tank at or below existing atmospheric pressure is accomplished with the pressure control means as hereabove disclosed. The preferred method of removing gas by vacuum from the last chamber of the aeration tank is accomplished with the vent gas control means as hereabove disclosed.

The present invention provides, in general, a vacuum exhaust control (VEC) method for controlling oxygen disolution. The VEC strategy involves operating the closed-tank reactor slightly below atmospheric conditions and using an exhaust apparatus to remove gas from the last chamber of the reactor. The inlet oxygen supply is regulated in a conventional manner but with a setpoint differential pressure of zero mm Hg or less relative to atmospheric pressure.

Although the present invention has been described and illustrated with respect to preferred embodiments and a preferred use therefor, it is not to be so limited since modifications and changes can be made therein which are within the full intended scope of the invention.

I Claim:

1. A method of treating wastewater using an aeration tank of the type having an interior divided into at least a first chamber and a last chamber with each of said chambers having a lower portion and an upper portion and having liquid passageways in said lower portions of each of said chambers and gas passageways in said upper portions of each of said chambers for allowing liquid and gas to pass sequentially through each of said chambers from said first chamber to said last chamber, having an effluent outlet associated with said last chamber of said aeration tank for allowing treated water to exit said aeration tank; and having agitator means to enhance oxygen transfer from said upper portion to said lower portion of said aeration tank; said method comprising the steps of:
   (a) adding wastewater and return sludge to said lower portion of said first chamber of said aeration tank at least until said wastewater and return sludge flows from said first chamber to said last chamber of said aeration tank through said liquid passageways in said lower portion of each of said chambers of said aeration tank;
   (b) introducing high-purity oxygen into said first chamber of said aeration tank;
   (c) maintaining the pressure in said upper portion of said first chamber of said aeration tank to at or slightly below existing atmospheric pressure; and
   (d) maintaining the dissolved oxygen in the effluent from said last chamber by removing gas by vacuum from said last chamber of said aeration tank.

2. A method of treating wastewater using an aeration tank of the type having an interior divided into at least a first chamber and a last chamber with each of said chambers having a lower portion and an upper portion, influent inlet means for allowing wastewater to be treated and return sludge to enter said lower portion of said aeration tank, oxygen inlet means for allowing high-purity oxygen to be introduced into said first chamber of said aeration tank, having liquid passageways in said lower portions of each of said chambers for allowing mixed liquor to pass sequentially through each of said chambers from said first chamber to said last chamber, gas passageways in said upper portions of each of said chambers for allowing gas to pass sequentially through each of said chambers from said first chamber to said last chamber, an effluent outlet associated with said last chamber of said aeration tank for allowing mixed liquor to exit said aeration tank, agitator means to enhance oxygen transfer from said upper portion to said lower portion of said aeration tank, and a gas outlet for allowing gas to exit said aeration tank; said method comprising the steps of:

(a) adding wastewater and return sludge to said lower portion of said first chamber of said aeration tank at least until said wastewater and return sludge flows from said first chamber to said last chamber of said aeration tank through said liquid passageways in said lower portion of each of said chambers of said aeration tank;

(b) introducing high-purity oxygen into said first chamber of said aeration tank;

(c) maintaining the pressure in said upper portion of said first chamber of said aeration tank to at or slightly below existing atmospheric pressure; and (d) maintaining the dissolved oxygen in the effluent from said last chamber by removing gas by vacuum from said last chamber of said aeration tank.

3. A method of treating wastewater comprising the steps of:

(a) adding wastewater to be treated and return sludge to the lower portion of the first chamber of an aeration tank having an interior divided into at least a first chamber and a last chamber with each of said chambers having a lower portion and an upper portion;

(b) introducing high-purity oxygen into said first chamber of said aeration tank;

(c) causing mixed liquor to pass sequentially through liquid passageways in said lower portions of each of said chambers from said first chamber to said last chamber;

(d) causing gas to pass sequentially through gas passageways in said upper portions of each of said chambers from said first chamber to said last chamber;

(e) allowing mixed liquor to exit said aeration tank through an effluent outlet associated with said last chamber of said aeration;

(f) enhancing oxygen transfer from said upper portion to said lower portion of said aeration tank;

(g) allowing gas to exit said aeration tank through a gas outlet;

(h) maintaining the pressure in said upper portion of said first chamber of said aeration tank to at or slightly below existing atmospheric pressure; and (h) maintaining the dissolved oxygen in the effluent from said last chamber by removing gas by vacuum from said last chamber of said aeration tank.

4. An improved method of treating wastewater including the steps of adding wastewater to be treated and return sludge to the lower portion of the first chamber of an aeration tank having an interior divided into at least a first chamber and a last chamber with each of said chambers having a lower portion and an upper portion; introducing high-purity oxygen into said first chamber of said aeration tank; causing mixed liquor to pass sequentially through liquid passageways in said lower portions of each of said chambers from said first chamber to said last chamber; causing gas to pass sequentially through gas passageways in said upper portions of each of said chambers from said first chamber to said last chamber; allowing mixed liquor to exit said aeration tank through an effluent outlet associated with said last chamber of said aeration; enhancing oxygen transfer from said upper portion to said lower portion of said aeration tank, and allowing gas to exit said aeration tank through a gas outlet; wherein the improvement comprises:

(a) maintaining the pressure in said upper portion of said first chamber of said aeration tank to at or slightly below existing atmospheric pressure; and (b) maintaining the dissolved oxygen in the effluent from said last chamber by removing gas by vacuum from said last chamber of said aeration tank.

* * * * *